US005906758A

United States Patent [19]

Severance, Jr.

[11] Patent Number: 5,906,758

[45] Date of Patent: May 25, 1999

[54] PLASMA ARC TORCH

[75] Inventor: Wayne Stanley Severance, Jr., Darlington, S.C.

[73] Assignee: The ESAB Group, Inc., Florence, S.C.

[21] Appl. No.: 08/940,678

[22] Filed: Sep. 30, 1997

[51] Int. Cl.[6] .................... B23K 10/00

[52] U.S. Cl. .................... 219/121.5; 219/121.49; 219/75; 219/121.39; 313/231.41

[58] Field of Search .................... 219/121.48, 121.49, 219/121.5, 121.51, 121.39, 74, 75; 313/231.31, 231.41

[56] References Cited

U.S. PATENT DOCUMENTS

| | | | |
|---|---|---|---|
| 4,282,418 | 8/1981 | Wuestner . | |
| 4,389,559 | 6/1983 | Rotolico et al. . | |
| 4,521,666 | 6/1985 | Severance, Jr. et al. . | |
| 4,902,871 | 2/1990 | Sanders et al. . | |
| 4,973,816 | 11/1990 | Habaerman | 219/121.51 |
| 5,023,425 | 6/1991 | Severance, Jr. . | |
| 5,124,525 | 6/1992 | Severance, Jr. et al. . | |
| 5,194,715 | 3/1993 | Severance, Jr. et al. | 219/121.48 |
| 5,304,770 | 4/1994 | Takabayashi . | |
| 5,393,952 | 2/1995 | Yamaguchi et al. . | |
| 5,628,924 | 5/1997 | Yoshimitsu et al. | 219/121.5 |
| 5,660,743 | 8/1997 | Nemchinsky . | |
| 5,747,767 | 5/1998 | Severance et al. | 219/121.5 |

FOREIGN PATENT DOCUMENTS

| | | |
|---|---|---|
| 8872 | 2/1991 | Japan . |

*Primary Examiner*—Mark Paschall
*Attorney, Agent, or Firm*—Alston & Bird LLP

[57] ABSTRACT

A plasma arc torch which has a cooling water passage for cooling both the electrode and the nozzle, and separate passages for a cutting gas and a shielding gas. The nozzle is centered and longitudinally held by an interengaging fit with a tubular member of the torch body, and the torch includes a heat shield assembly which retains and supports the nozzle of the torch on the tubular member. The heat shield assembly also defines a portion of the cooling water passage as well as a portion of the shielding gas passage, and it may be unthreaded and removed from the torch as a unit. When so removed, the water passage is opened which acts to disconnect the power to the torch.

16 Claims, 3 Drawing Sheets

PLASMA ARC TORCH

BACKGROUND OF THE INVENTION

The present invention relates to a plasma arc torch of the type commonly used to cut or weld a metal workpiece.

U.S. Pat. No. 5,393,952 discloses a plasma arc torch having a water cooled electrode, and a nozzle positioned to form a plasma gas passage between the electrode and the nozzle and leading to a nozzle discharge opening immediately below the electrode. The nozzle is mounted on a gas swirl baffle which is interposed between the electrode and the nozzle. Also, a nozzle cap covers the nozzle, and an outer shield surrounds the nozzle cap so as to define a shielding gas passage which exits about the discharge opening of the nozzle.

It is an object of the present invention to provide an improved plasma arc torch of the described type, and wherein the nozzle is supported directly by the torch body so as to be accurately located, both concentrically and longitudinally with respect to the other torch components.

It is also an object of the present invention to provide an improved plasma arc torch which avoids the use of a cutting gas swirl baffle or ring for mounting the nozzle, and whereby the nozzle may be more accurately seated and located with respect to the other torch components.

It is a further object of the present invention to provide a plasma arc torch having a heat shield assembly surrounding the nozzle so as to define a shielding gas passage therebetween, and wherein the heat shield assembly also retains the nozzle, and defines a portion of a water cooling passage which cools the outside of the nozzle.

SUMMARY OF THE INVENTION

The above and other objects and advantages of the present invention are achieved in the embodiment illustrated herein by the provision of a plasma arc torch which comprises an upper body member having a depending sleeve which defines a central axis, and an electrode holder mounted within the depending sleeve and extending axially therefrom to a distal end. An electrode is mounted at the distal end of the electrode holder. A sleeve assembly is joined to the upper body member and surrounds the depending sleeve and extends axially to a tubular lower end, and a nozzle coaxially surrounds the electrode in a spaced-apart relation to define a space therebetween. The nozzle includes a cylindrical portion disposed within the tubular lower end of the sleeve assembly with an interengaging fit, which serves to concentrically locate the nozzle with respect to the electrode and the other torch components. The nozzle further includes a discharge opening which is coaxially aligned below the nozzle and a shoulder which directly engages the lower end of the sleeve assembly, with the engagement between the shoulder and the lower end of the sleeve assembly serving to accurately locate the nozzle longitudinally with respect to the electrode and the other torch components.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Figures 1, 3, 4:
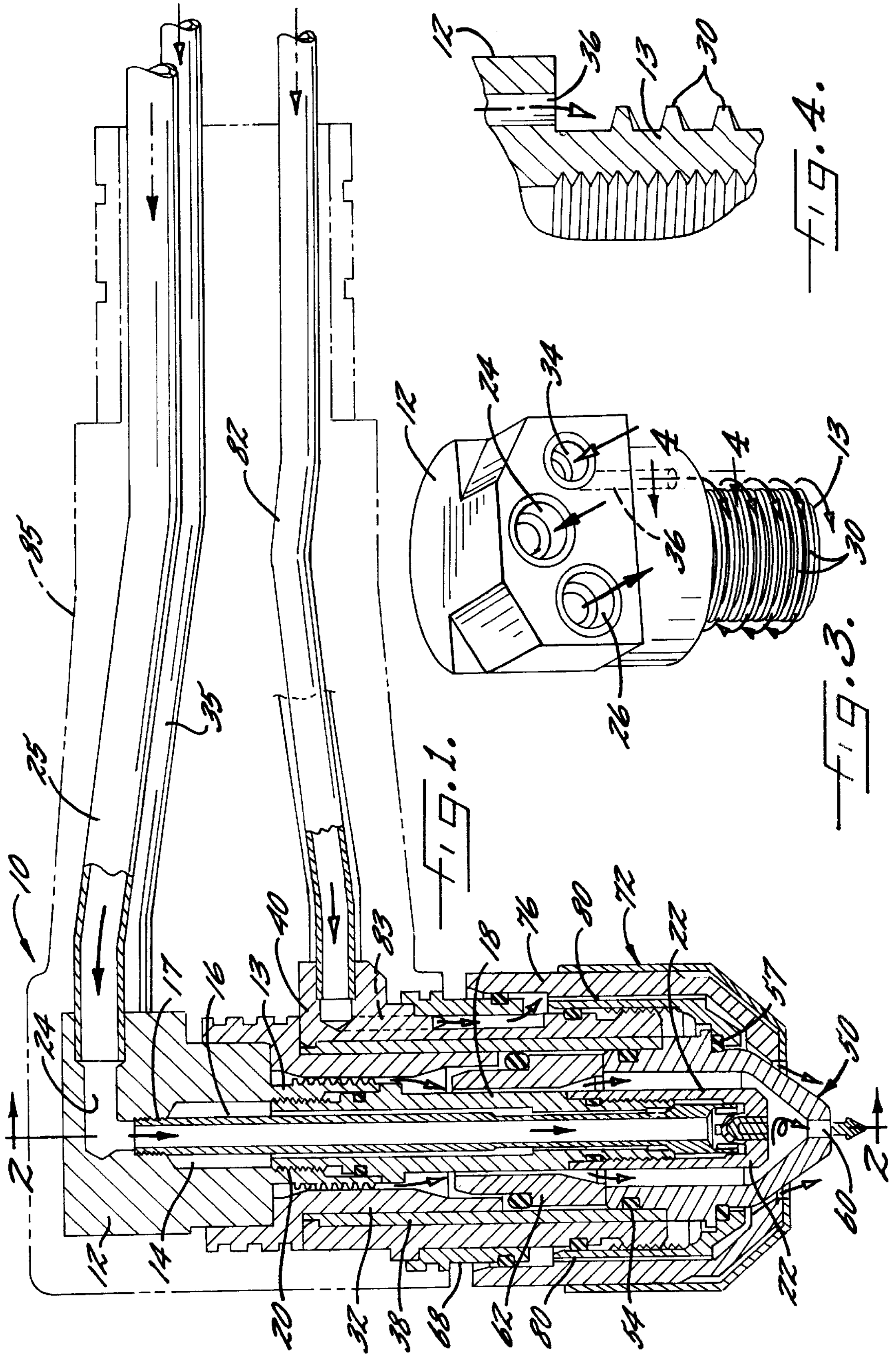
FIG. 1 is a sectional side elevation view of a plasma arc torch which embodies the features of the present invention.
FIG. 3 is a perspective view of the upper body member of the torch shown in FIGS. 1 and 2.
FIG. 4 is a fragmentary enlarged sectional view illustrating the helical threads on the outside of the depending sleeve of the upper body member and taken substantially along the line 4—4 of FIG. 3.

Referring more particularly to the drawings, a plasma arc torch which embodies the present invention is indicated generally at 10. The torch 10 comprises an upper body member 12 which is preferably made of brass and which includes an integral depending sleeve 13. The interior of the sleeve 13 forms a part of an internal vertical bore 14 in the upper body member, which coaxially receives an elongate tubular brass baffle 16 which is threadedly joined in the bore at 17. Also, a tubular brass electrode holder 18 is coaxially disposed on the outside of the baffle, and the holder is threadedly joined in the bore 14 at 20. A cup shaped electrode 22 of the type disclosed, for example, in U.S. Pat. No. 5,023,425, is joined at the lower end of the holder.

Figures 6, 7:
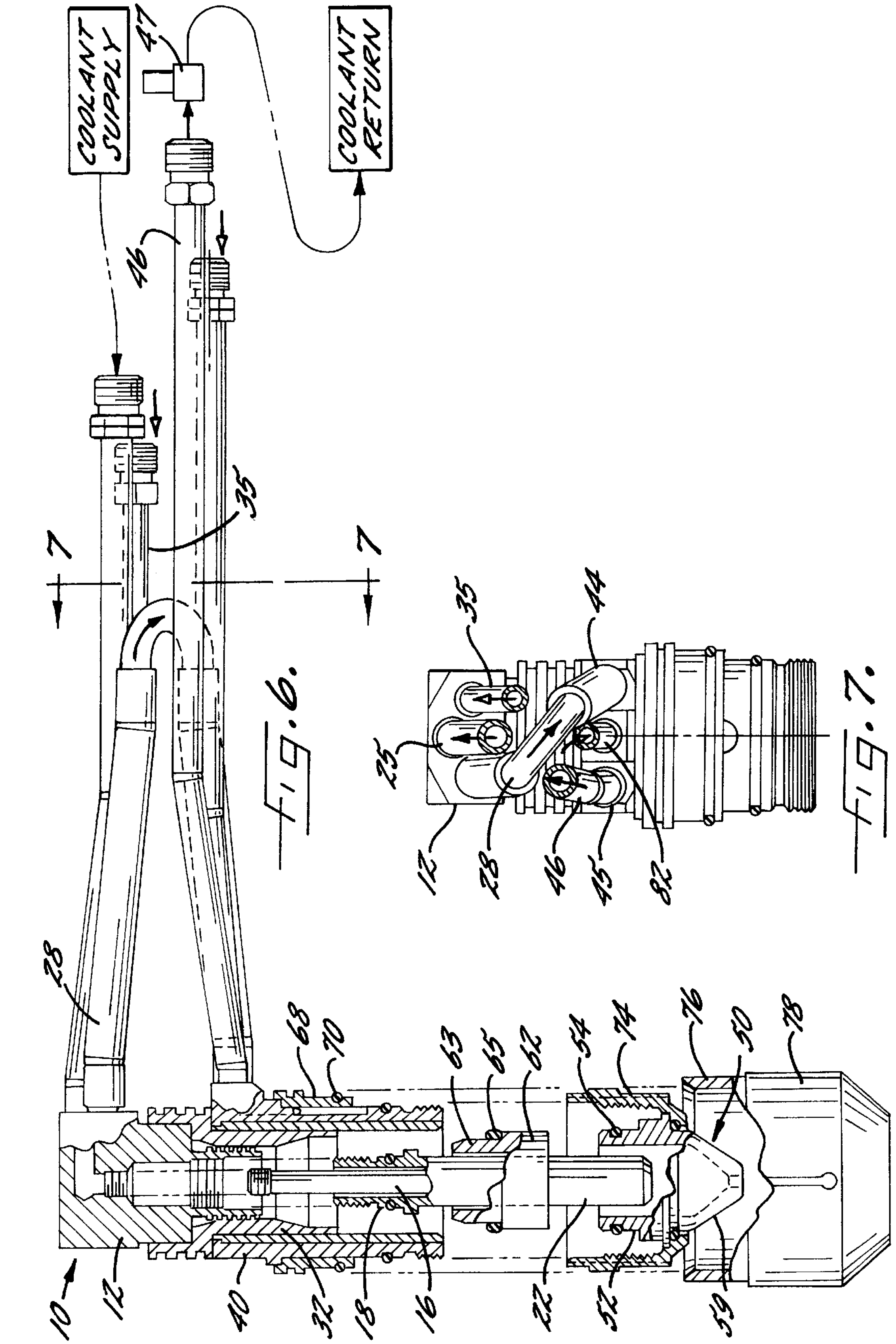
FIG. 6 is an exploded sectional view similar to FIG. 1.
FIG. 7 is a sectional view taken substantially along the line 7—7 of FIG. 6.

The bore 14 of the upper body member communicates with a radial passage 24, which is connected to a coolant (water) supply line 25, whereby cooling water is supplied to the passage 24 which then flows downwardly through the interior of the baffle 16 to the electrode 22. From the electrode, the cooling water flows upwardly between the baffle 16 and the holder 18 to a second radial passage 26 in the upper body member which is connected to a jumper hose 28 (FIGS. 6 and 7).

The exterior surface of the depending sleeve 13 of the upper body member 12 includes a relatively coarse helical thread 30 for the purposes described below. Also, a plastic tubular insulator sleeve 32 is coaxially joined to the upper body member so as to surround the depending sleeve 13 and extend downwardly therebeyond. The upper body member 12 includes a radial passage 34 (FIG. 2) which is connected to a cutting or plasma gas delivery line 35, and the radial passage 34 communicates with an axial bore 36 which in turn communicates with the space between the outside of the depending sleeve 13 and the tubular insulator sleeve 32.

Figure 2:
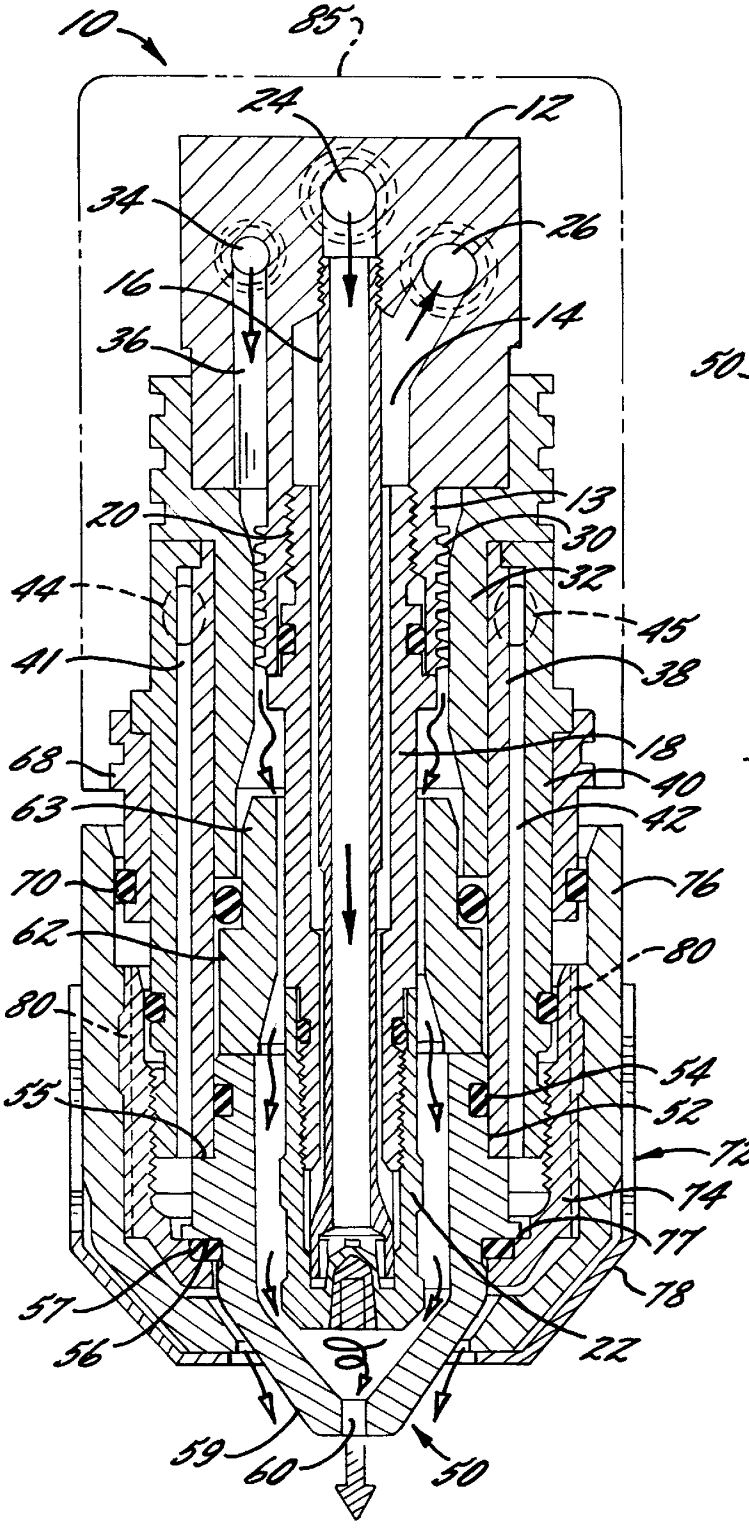
FIG. 2 is a sectional view taken substantially along the line 2—2 of FIG. 1.
Figure 5:
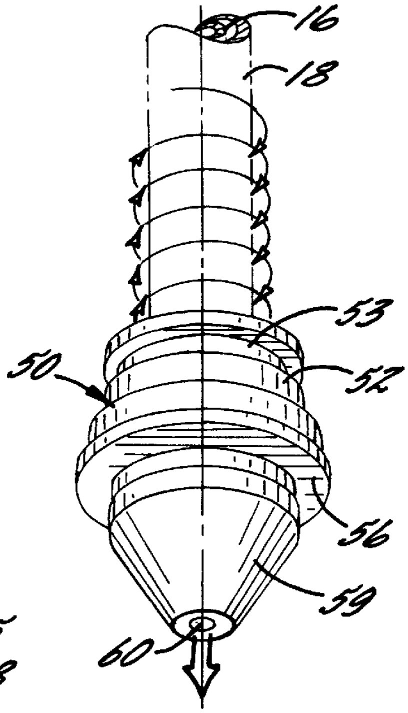
FIG. 5 is a fragmentary perspective view of the electrode holder and nozzle of the torch.

The plasma torch 10 further includes a tubular stainless steel insert 38 which is coaxially fit onto the outside of the insulator sleeve 32, and a brass outer sleeve 40 is coaxially fit onto the outside of the metal insert 38. The brass outer sleeve 40 has an internal bore of oval outline when viewed in cross section, so as to define two vertical side passages 41, 42 between the metal insert 38 and the brass outer sleeve 40, as best seen in FIG. 2. The upper end of the side passage 41 is joined via a radial bore 44 to the jumper hose 28 so that the cooling water flows into the side passage 41. The upper portion of the side passage 42 is joined via a radial bore 45 in the outer sleeve 40 with the coolant outlet line 46. A flow switch 47 (FIG. 6) is positioned in the outlet line 46 for the purpose described below.

A nozzle 50 is joined by an interengaging or press fit into the inside bore of the metal insert 38. More particularly, the nozzle 50 comprises a body member composed of an annular wall which defines a central axis and which includes a cylindrical external portion 52 which is received concentrically in the inside bore of the metal insert 38. A groove 53 in the cylindrical external portion accommodates a sealing O-ring 54. Also an upper shoulder 55 extends radially outwardly at one end of the cylindrical external portion, which engages the end of the metal insert 38. A second shoulder 56 faces downwardly, and engages a retaining member as further described below. A sealing O-ring 57 is disposed about the annular body adjacent the second shoulder. The annular wall of the nozzle further comprises a frusto conical lower end portion 59, which terminates in an outlet or discharge opening 60 which is coaxially aligned below the electrode 22.

The press fit mounting of the cylindrical external portion 52 of the nozzle 50 in the inside diameter of the tubular metal insert 38 insures the concentric alignment of the nozzle with the electrode 22 and the other torch components. Also, the abutting engagement between the shoulder 55 and the end of the metal insert 38 insures the desired longitudinal alignment of the nozzle.

A tubular ceramic insulator 62 is disposed between the metal insert 38 and the electrode holder 18, and the insulator 62 includes an upper sleeve portion 63 which extends into the lower end of the plastic insulator sleeve 32. Also, the ceramic insulator 62 includes an external shoulder which supports a sealing O-ring 65.

A plastic tubular insulator 68 is mounted coaxially about the outside of the outer sleeve 40 of the torch, and the insulator 68 includes a groove which mounts a sealing O-ring 70 as further described below.

A heat shield assembly 72 is threadedly joined to the lower end of the outer sleeve 40, and retains the nozzle 50 in its operative position on the metal insert 38. The heat shield assembly 72 includes an annular brass insert 74 which is threadedly connected to the lower end portion of the outer sleeve 40. A non-metallic plastic jacket 76 surrounds the outside of the insert 74, with the insert 74 and the jacket 76 being joined to each other by means of an interengaging fit therebetween. The insert 74 includes an internal shoulder 77, which is positioned to engage the shoulder 56 of the nozzle and thereby retain the nozzle in its operative position. Also, the sealing O-ring 57 is positioned to form a seal between the two shoulders 56 and 77.

The heat shield assembly 72 may further include an annular metal guard 78 which is joined to the outside of the non-metallic jacket 76 by a press fit.

The exterior surface of the insert 74 includes a plurality of vertical splines, which define vertical gas passages 80 between the exterior surface of the insert 74 and the internal surface of the jacket 76, for the purpose described below. Also, and as best seen in FIG. 2, the insert 74 forms a communicating water passage between the side passage 41 and the side passage 42, and thus the cooling water is able to directly contact and cool the exterior surface of the nozzle 50.

When the heat shield assembly 72 is threadedly joined to the outer sleeve 40, the upper end of the jacket 76 overlies the lower portion of the plastic tubular insulator 68, and the O-ring 70 acts to provide a seal therebetween, which seals the shield gas flow path as further described below.

An inlet line 82 for the shielding gas connects to the outer sleeve 40, and an axially extending internal passage 83 (FIG. 1) in the outer sleeve 40 connects the inlet line 82 to the vertical gas passages 80 between the insert 74 and the jacket 76 of the heat shield assembly.

The components of the torch as described above, including a portion of the coolant and gas lines, are retained and supported in a molded outer body, which is schematically shown in the drawings at 85.

Cooling Water Flow Path

The cooling water enters the torch through the line 25 and passes downwardly through the interior of the baffle 16 to the inside of the cup shaped electrode 22. From the electrode, the water flows upwardly along the outside of the baffle 16 and exits via the passage 26 to the jumper hose 28. The jumper hose 28 connects via the bore 44 in the outer sleeve 40 to the side passage 41, and the jumper hose thus provides a water path from the upper body member to the outer sleeve 40, while breaking the electrical path.

From the side passage 41, the water flows downwardly to the space surrounding the nozzle 50 defined by the insert 74 of the heat shield assembly 72, and so as to cool the nozzle. The water then flows upwardly through the side passage 42 to the water outlet line 46 via the bore 45.

Cutting Gas Flow Path

The cutting or plasma gas flows into the passage 34 in the body member 12 via the line 35, and it then flows downwardly through the annular space between the depending sleeve 13 of the upper body member and the plastic insulator sleeve 32. The relatively course threads 30 on the depending sleeve impart a swirling motion to the entering gas, which continues as the gas moves downwardly past the electrode 22 and out from the discharge opening 60 in the nozzle 50. Thus, the desired swirling motion is achieved without the use of a separate swirl ring immediately adjacent the nozzle, as is conventional.

Shield Gas Flow Path

The shield gas enters the outer sleeve 40 via the line 82, and it passes downwardly through the passage 83 to the heat shield assembly 72. The shield gas then passes downwardly through the gas passages 80 formed between the insert 74 and the jacket 76, and the gas then flows outwardly along the outside of the frusto conical nose portion 59 of the nozzle.

Removal of the Heat Shield Assembly

The three components of the heat shield assembly 72 are press fit together, and they are thereby removable as a unit by unthreading the unit from the outer sleeve 40 of the torch. Upon such removal, the water path is broken, and the flow switch 47 opens to thereby terminate operation of the torch. This safety feature minimizes the risk of accidental electrical shock by contacting the internal components of the torch while it is electrically connected.

When the heat shield assembly 72 is removed, the nozzle 50 may be axially withdrawn from the metal insert 38, and the electrode 22 and electrode holder 18 then may be unthreaded and removed. The baffle 16 may then also be easily removed by unthreading. Thus these several components of the torch may be easily removed and repaired or replaced as necessary.

In the drawings and specification, there has been set forth a preferred embodiment of the invention, and although specific terms are employed, they are used in a generic and descriptive sense only and not for purposes of limitation.

That which is claimed:

1. A plasma arc torch comprising an upper body member having a depending sleeve which defines a central axis;

an electrode holder mounted within the depending sleeve and extending axially therefrom to a distal end, an electrode mounted at said distal end of said electrode holder, a sleeve assembly joined to the upper body member and surrounding the depending sleeve and extending axially to a tubular lower end, and a nozzle coaxially surrounding the electrode in a spaced-apart relation to define a space therebetween and including a cylindrical portion disposed within the tubular lower end of said sleeve assembly with an interengaging fit, said nozzle further including a discharge opening which is coaxially aligned below said nozzle and an external shoulder which directly engages the lower end of the sleeve assembly.

2. The plasma arc torch as defined in claim 1 further comprising a cutting gas passage for delivering a cutting gas to the space between said electrode and said nozzle and so as to be discharged through said discharge opening of said nozzle, said cutting gas passage including a gas passage portion between said depending sleeve and said sleeve assembly.

3. The plasma arc torch as defined in claim 2 wherein said cutting gas passage further includes relatively coarse helical threads formed between said depending sleeve and said sleeve assembly for imparting a swirling motion to a gas passing through said cutting gas passage.

4. The plasma arc torch as defined in claim 1 wherein said sleeve assembly includes a tubular lower end portion which is externally threaded, and wherein said torch further comprises a heat shield assembly threadedly connected to the lower end portion of the sleeve assembly, with the heat shield assembly and the nozzle including mating shoulders for retaining the nozzle assembled to the sleeve assembly.

5. The plasma arc torch as defined in claim 4 wherein the heat shield assembly includes an annular metal insert which is threadedly connected to the lower end portion of the sleeve assembly, a non-metallic jacket surrounding the outside of the metal insert, with the metal insert and the jacket being joined to each other by means of an interengaging fit therebetween.

6. The plasma arc torch as defined in claim 5 wherein said heat shield assembly further comprises an annular metal guard joined to the outside of said non-metallic jacket.

7. The plasma arc torch as defined in claim 5 further comprising a water passage including a first water passage portion extending through the interior of said electrode holder to said electrode, and from said electrode to a second water passage portion between said nozzle and said annular metal insert.

8. A plasma arc torch as defined in claim 7 further comprising a flow switch operatively connected to said water passage for interrupting the operation of the torch upon the heat shield assembly being removed from the torch and thereby breaking the water passage.

9. The plasma arc torch as defined in claim 7 further comprising a cutting gas passage for delivering a cutting gas to the space between said electrode and said nozzle and so as to be discharged through said discharge opening of said nozzle, and a shield gas passage for delivering a shield gas coaxially about the exterior of said nozzle.

10. The plasma arc torch as defined in claim 9 wherein said shield gas passage includes a shield gas passage portion formed between said annuler metal insert and said non-metallic jacket.

11. The plasma arc torch as defined in claim 1 wherein said sleeve assembly comprises a tubular insulator sleeve surrounding the depending sleeve and joined to said upper body member, a tubular metal insert coaxially surrounding and joined to the tubular insulator sleeve, and a tubular outer sleeve coaxially surrounding the metal insert.

12. A plasma arc torch comprising an upper body member having a depending sleeve which defines a central axis;

an electrode holder mounted within the depending sleeve and extending axially therefrom to a distal end, an electrode mounted at said distal end of said electrode holder, a tubular insulator sleeve surrounding the depending sleeve and extending axially to a lower end, a tubular metal insert coaxially surrounding and joined to the tubular insulator sleeve, with the metal insert having a lower end which extends axially beyond the lower end of the insulator sleeve, a tubular outer sleeve coaxially surrounding the metal insert, with the tubular outer sleeve having a lower end which is substantially aligned with the lower end of said metal insert, and a nozzle coaxially surrounding the electrode in a spaced-apart relation to define a space therebetween and including a cylindrical portion disposed within the lower end of said tubular metal insert with an interengaging fit, said nozzle further including a discharge opening which is coaxially aligned below said nozzle and an external shoulder which directly engages the lower end of the tubular metal insert.

13. The plasma arc torch as defined in claim 12 wherein said tubular outer sleeve includes external threads adjacent the lower end thereof, and further comprising a heat shield assembly threadedly connected to the external threads of said tubular outer sleeve with the heat shield assembly and the nozzle including mating shoulders for retaining the nozzle assembled to the tubular metal insert.

14. A heat shield assembly for a plasma arc torch and comprising an annular metal insert which includes internal threads for joining the assembly to a plasma torch body, said metal insert further including an annular internal shoulder for engaging and supporting a nozzle of the plasma torch, and a non-metallic jacket surrounding the outside of the metal insert, with the metal insert and the jacket being joined to each other by means of an interengaging fit therebetween.

15. The heat shield assembly as defined in claim 14 wherein said inner heat shield member and said non-metallic jacket include a gas passage formed therebetween.

16. The heat shield assembly as defined in claim 15 further comprising an annular metal guard joined to the outside of said non-metallic jacket.

* * * * *